United States Patent

[11] 3,536,031

[72] Inventor Charles Peter Sindall
Billericay, Essex, England
[21] Appl. No. 790,022
[22] Filed Jan. 9, 1969
[45] Patented Oct. 27, 1970
[73] Assignee The Colchester Lathe Company Limited
Colchester, Essex, England
a British company
[32] Priority Jan. 22, 1968
[33] Great Britain
[31] 3,182/68

[54] DIAL ASSEMBLIES
9 Claims, 5 Drawing Figs.
[52] U.S. Cl............................................. 116/115.5,
33/166
[51] Int. Cl..................................................... B23q 17/00

[50] Field of Search....................................... 116/115,
115.5, 124, 133; 74/813, 826, 827, 10.8; 33/166

[56] References Cited
UNITED STATES PATENTS
Re. 26,527 2/1969 Rabinow...................... 116/115.5
3,418,965 12/1968 Rabinow...................... 116/115.5

Primary Examiner—Louis J. Capozi
Attorney—Bacon & Thomas

ABSTRACT: A dial assembly for enabling visual readings to be taken in either imperial or metric units of linear movement of a member, for example, a tool of a lathe, including a sleeve having both scales marked circumferentially thereon, said sleeve being axially movable to associate one scale with a cursor and simultaneously selecting a friction drive for rotating the sleeve in the appropriate scale.

INVENTOR
CHARLES P. SINDALL
BY
Bacon & Thomas
ATTORNEYS

Patented Oct. 27, 1970

INVENTOR
CHARLES P. SINDALL
BY
Bacon & Thomas
ATTORNEYS

DIAL ASSEMBLIES

This invention relates to dial assemblies which will enable readings to be taken of the linear travel of an asociated member on two endless scales having different unit measurements.

There are many instances in the machine tool industry in which a dial is attached to a machine to enable the operator to take readings of linear movement of part of the machine or the work. For example, it is standard practice to attach a dial to a lathe to enable readings to be taken of the amount of feed of a cutting tool. Such a dial may be driven by the hand wheel for rotating the feed screw and the calibrations on the dial are determined by the pitch of the feed screw.

In countries which at present adopt the imperial unit of measurement, the feed screw pitch will be in decimals of an inch and the graduations on the dial will be numbered accordingly. If, in such instances, it is desired for the operation to be carried out in metric units, some adaptation is necessary to the dial assembly if the same feed screw is to be used.

It is the main object of this invention to provide a dial assembly for adaptation of a machine tool from imperial unit measurement to metric unit measurement and vice versa.

According to the present invention there is provided a dial assembly for enabling visual readings to be taken in either one of two scales of linear movement of a member, including a rotatable hand wheel adapted for connection to impart linear movement to the said member, a sleeve having both of said scales marked circumferentially on the external surface thereof and being axially movable in relation to said hand wheel and in relation to a cursor through which one of the said two scales may selectively be read, the arrangement being such that, on the sleeve being moved to associate one of said scales with the cursor, the drive of the said sleeve by the hand wheel is direct and on the sleeve being moved to associate the other of said scales with the cursor, the drive of the said sleeve by the hand wheel is through gearing having such a ratio that the said other scale is continuing (as herein defined) for successive revolutions of the hand wheel.

By "continuing" when referring to a scale is meant an endless scale in which the origin coincides and therefore forms a graduation for a major division some distance along the scale thereby enabling all the divisions of the scale used for the first revolution of the hand wheel to be used also for subsequent revolutions of the hand wheel.

In order to illustrate the arrangement of the scales one example will be given.

In a lathe, the feed screw pitch is 0.2 inches. The imperial scale on the sleeve is calibrated into 200 equal divisions each of which will therefore represent a movement of the said member of 0.001 inches, (one revolution of the hand wheel and therefore the sleeve which is directly driven by the hand wheel represents 0.2 inches). Now if the hand wheel is rotated five times, the member will move one inch or 25.4 mm and, if the sleeve were directly driven by the hand wheel when using the metric scale, each revolution of the sleeve and hand wheel would represent a travel of the member of 25.4/5 or 5.08 mm. Calibrating the metric scale to read 5.08 mm per revolution must be considered impractical since this would result in a noncontinuing scale when more than one revolution of the hand wheel is made and therefore to make the metric scale continuing and using a reasonable number of graduations (250 is a suitable number), the sleeve must rotate faster than the hand wheel by the ratio 5.08/5 or 1,016/1. Utilizing a gear ratio of 127/125 gives this figure exactly.

Thus, by utilizing a gear ratio of 127/125 for the drive of the sleeve by the hand wheel when the metric scale is being used, the metric scale on the sleeve may be graduated into 250 equal divisions each representing 0.02 mm travel of the member and the scale will be continuing.

The invention also includes the provision of a friction drive between the hand wheel and the sleeve shiftable from direct drive or through the gearing by axial movement of the sleeve. Such friction drive enables zero setting of the two scales and prevents overloading of the gears if the hand wheel and sleeve are not allowed to turn freely together.

Two embodiments of dial assemblies constructed according to the invention will now be described, by way of example only, and with reference to the accompanying drawings, in which.

Figure 1:
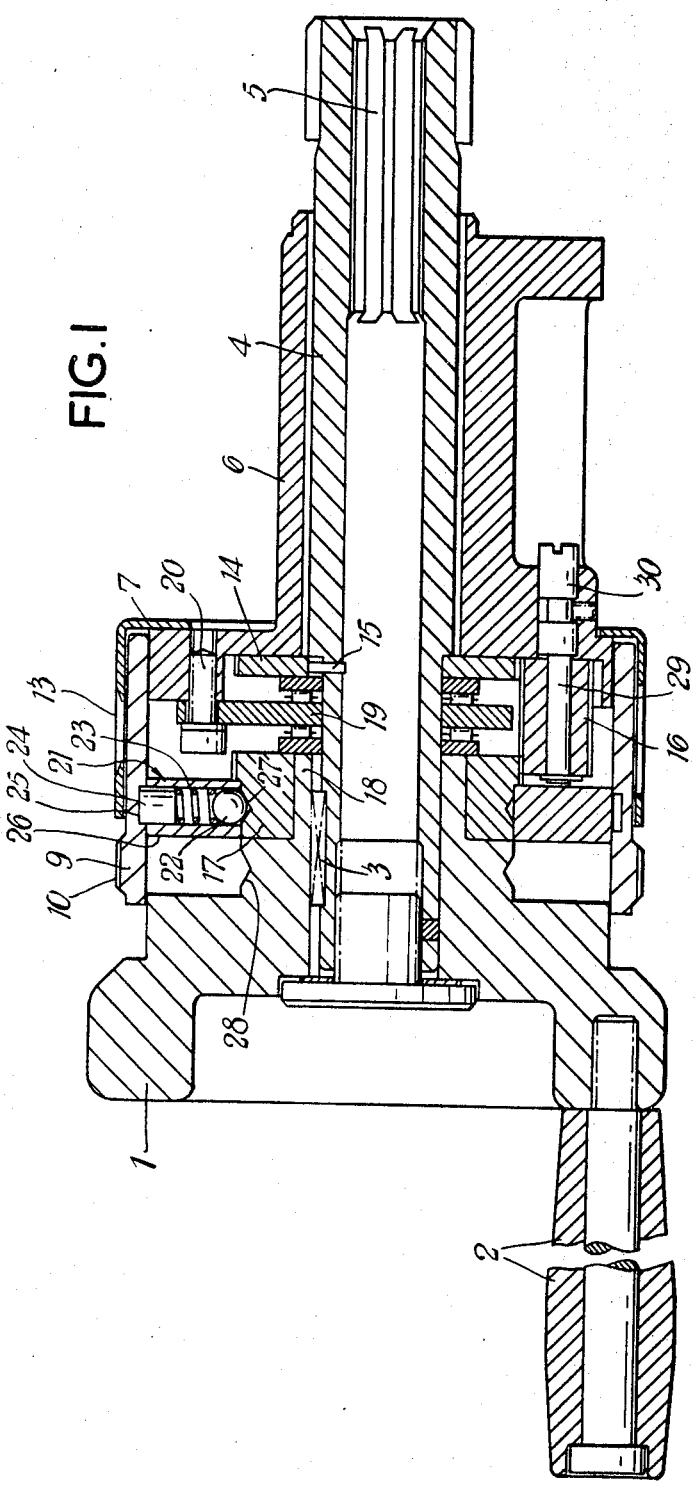
FIG. 1 is a longitudinal cross-sectional view through one form of dial assembly.
Figure 2:
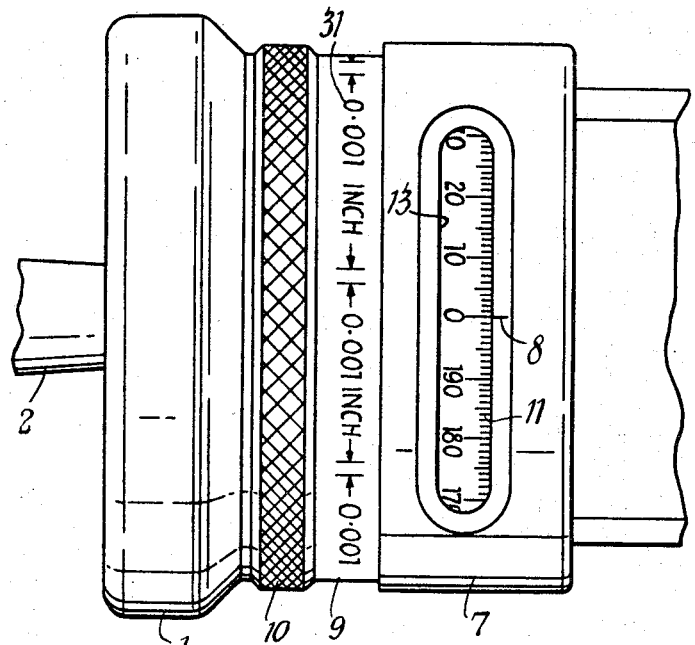
FIG. 2 is a plan view of the dial assembly of FIG. 1 in a position for reading on the imperial scale.
Figure 3:
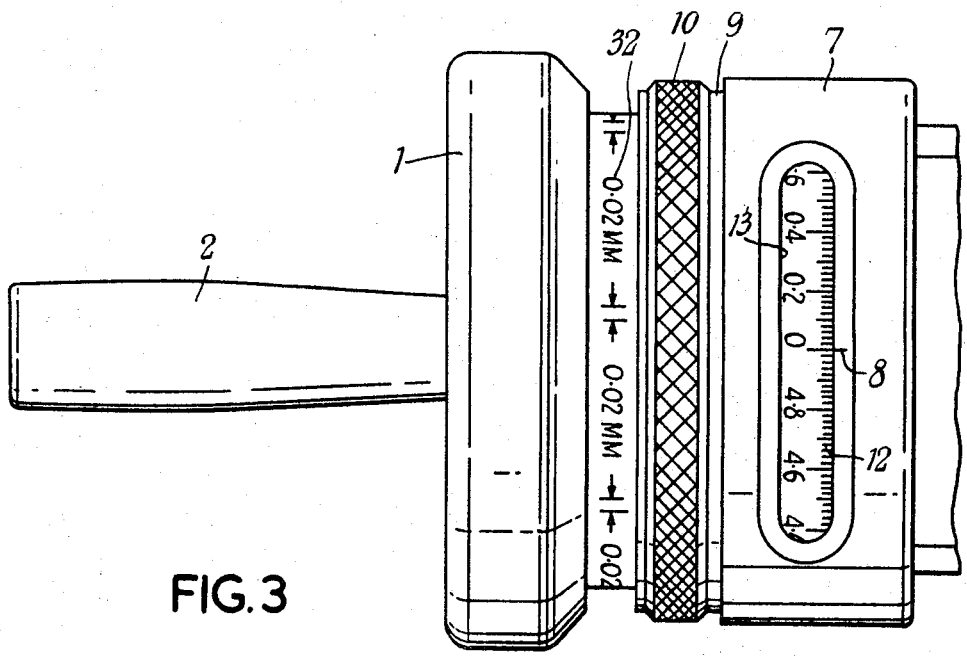
FIG. 3 is a plan view of the dial assembly of FIG. 1 in a position for reading on the metric scale.

Referring first to FIGS. 1 to 3, a dial assembly includes a hand wheel 1 having a hand grip 2 attached thereto, the hand wheel 1 being keyed at 3 to a shaft 4 which is splined at 5 for driving the feed screw of a lathe. The shaft 4 passes through a casing 6 which carries a cursor 7 having a cursor line 8 marked thereon against which readings are taken. In this embodiment, the cursor 7 is cylindrical to assist in keeping foreign matter such as dirt and the like out of the dial assembly. Within the cursor 7 is a sliding sleeve 9 having a knurled part 10 for gripping purposes to enable the sleeve 9 to be shifted axially in relation to the cursor 7 and hand wheel 1 and for zero setting of two scales. These two scales are arranged circumferentially on the outer surface of sleeve 9, the scale 11, seen in FIG. 2, being an imperial scale and the scale 12, seen in FIG. 3, being a metric scale and these two scales may be viewed selectively through a window 13 of the cursor 7.

Beneath the sleeve 9 is a gear wheel 14 keyed at 15 for rotation with the shaft 4 and hence hand wheel 1 and meshing with idler gear 16 which drives gear wheel 17 freely mounted on a shoulder 18 of hand wheel 1. The gear wheels 14 and 17 are held against axial movement by thrust bearing assembly 19 secured to casing 6 by screws 20. A plurality (for example three) of friction drive elements 21 are secured to sleeve 9 and equally spaced around the gear wheel 17 and each friction drive element 21 includes a ball 22 loaded by a spring 23, the outer end of spring 23 bearing upon a plug 24 which engages in a recess 25 in the inner face of sleeve 9 and each ball 22, spring 23 and plug 24 being contained in a cylindrical housing 26. The ball 22 runs in either track 27 in gear wheel 17 or track 28 in hand wheel 1.

The idler gear 16 is mounted on eccentric pin 29 and is adjustable by screw head 30 to minimize any backlash in the gear train.

With the sleeve 9 in the position illustrated in FIG. 2, the imperial scale 11 shows in the window 13 and the operator is aware of this by the information marked at 31 on the outer surface of sleeve 9. In this position of sleeve 9, rotation of the hand wheel 1 to drive the member also drives the sleeve 9 directly by the balls 22 of friction drive elements 21 engaging in track 28.

To operate in metric units, the sleeve 9 is moved so that the balls 22 engage in track 27, FIGS. 1 and 3, and the scale 12 shows in window 13. The operator is aware that the metric scale is in use by information marked at 32 on hand wheel 1. In this position, the drive of the sleeve 9 by the hand wheel 1 is through the gear train.

It will be noted that the gear train is constantly in mesh regardless of the scale being used. To render the scale 12 continuing, the gear 14 has 127 teeth and the gear 17 has 125 teeth and this gives the exact conversion ratio desired.

It will be appreciated that the figures given above for the feed screw pitch, number of divisions of the two scales and the number of teeth of the gears are only examples and other figures may be used. It is, however, essential that both scales be continuing and the number of graduations be so chosen that they are sufficiently numerous for accurate readings to be taken and are also readily readable by an operator.

Figure 4:
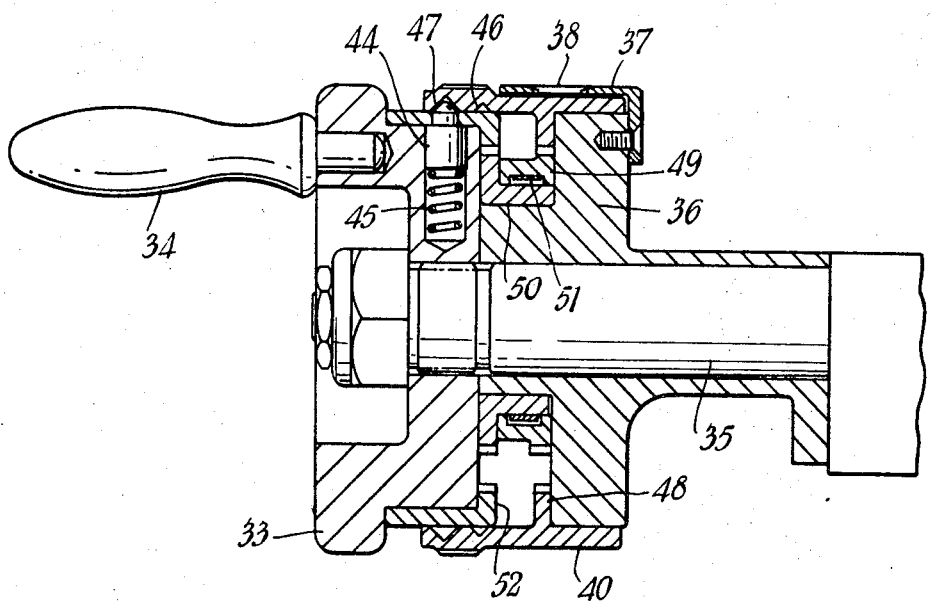
FIG. 4 is a longitudinal cross-sectional view through a further form of dial assembly.
Figure 5:
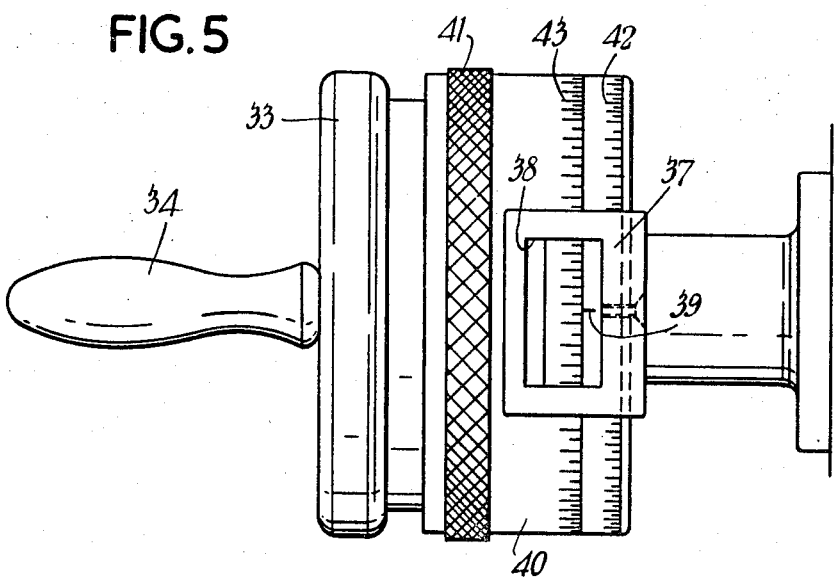
FIG. 5 is a plan view of the dial assembly of FIG. 4.

Referring now to FIGS. 4 and 5 of the drawings, a dial assembly has a hand wheel 33 with a hand grip 34 attached thereto, the hand wheel 33 being keyed to a shaft 35 which drives a member as in the previous embodiment. A casing 36 carries a cursor 37 having a window 38 and a cursor line 39 from which readings are taken. A sliding sleeve 40 has a knurled part 41 and on the outer surface of sleeve 40 are two continuing scales 42 and 43. The scale 42 is in imperial units and the scale 43 in metric units. Friction drive pins 44 (there may be three as in the previous embodiment) are loaded by springs 45 into engagement with a track 46 but are non-cooperative with enlarged groove 47. With pins 44 in groove 47, a gear 48 engages with intermediate gear 49 which is in frictional engagement with idler gear 50. This frictional engagement is by a corrugated ring 51 which allows zero setting and prevents overloading of the gears.

The drive from the hand wheel 33 to the sleeve 40, when using the imperial scale, is direct by pins 44 engaging in groove 46 whereas on moving sleeve 40 so that the friction drive pins 44 are inoperative in groove 47, the drive from hand wheel 33 to sleeve 40 is through the gears 52, 50, 49 and 48. Gear 52 has 127 teeth and gear 48 has 125 teeth to give the desired conversion ratio as in the previous embodiment to make the scale continuing.

The construction of a dial assembly in accordance with the invention may be modified from the embodiments above described within the scope of the appended claims.

With the dial assembly in accordance with the invention there must be a deliberate act on the part of the operator to change from one scale to the other which results in an automatic masking of the unused calibrations and a clear indication of the used calibrations. There is maximum prevention of ingress of foreign matter and the gear train cannot be overstrained by missue. Also zero setting is provided for.

I claim:

1. In a dial assembly for enabling visual readings to be taken in either one of two scales of linear movement of a member, a rotatable hand wheel adapted for connection to impart linear movement to the said member, wherein the improvement comprises:
   a fixed support, a sleeve mounted on said support for axial movement and having both of said scales marked circumferentially on the external surface thereof;
   a cursor fixed on said support and overlying said scales so that one or the other of said scales is selectively associated with the said cursor by axial movement of the said sleeve;
   a gear train connected between said hand wheel and said sleeve; and
   drive means selectively operable by axial movement of said sleeve alternatively to drive the said sleeve directly from the said hand wheel or to drive the said sleeve from the said hand wheel through the said gear train, the said gear train having such a ratio that when the said sleeve is driven through the said gear train by rotation of said hand wheel, the scale then associated with the said cursor is continuing.

2. In a dial assembly as claim in claim 1, the improvement comprising the said drive means being a friction drive.

3. In a dial assembly as claimed in claim 2, the improvement comprising a friction drive track formed on said hand wheel and a friction drive track formed on the output member of said gear train, the said friction drive comprising at least one spring loaded ball selectively engaging one of the two tracks.

4. In a dial assembly as claimed in claim 1, the improvement comprising said gear train including:
   a first gear wheel drivingly connected with said sleeve;
   an idler gear; and
   a second gear wheel, said second gear wheel being fixed for rotation with said hand wheel and driving said idler gear which drives said first gear wheel.

5. In a dial assembly as claimed in claim 2, the improvement comprising the said friction drive including:
   a friction drive track formed on said sleeve, at least one pin carried by said hand wheel and selectively engageable in said track; and
   a corrugated ring positioned between a first gear wheel and a second gear wheel of said gear train frictionally connecting the gear wheels together.

6. In a dial assembly as claimed in claim 5, the improvement comprising:
   a gear fixed for rotation with the said hand wheel; and
   an intermediate gear, the said first gear wheel being driven by the said gear and the said intermediate gear being fixed for rotation with the said sleeve, the said second gear wheel being selectively engageable with the said intermediate gear.

7. In a dial assembly as claimed in claim 1, the improvement comprising the said gear train having a ratio of 127:125 or 125:127.

8. In a dial assembly as claimed in claim 1, the improvement comprising means carried by said cursor covering one of said scales while the other of said scales is associated with the cursor.

9. In a dial assembly as claimed in claim 1, the improvement comprising first indicating means carried by said hand wheel designating one scale of linear movement and second indicating means carried by said sleeve designating the other scale of linear movement whereby axial movement of said sleeve results in covering the indicating means not then associated with the cursor while revealing the indicating means then associated with the cursor.